(12) United States Patent
Shaw

(10) Patent No.: US 9,151,347 B1
(45) Date of Patent: Oct. 6, 2015

(54) CONTROL SYSTEM FOR OPERATING A MANUAL CLUTCH

(71) Applicant: BorgWarner Inc., Auburn Hills, MI (US)

(72) Inventor: Wesley L. Shaw, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/665,443

(22) Filed: Mar. 23, 2015

(51) Int. Cl.
| | |
|---|---|
| F16D 25/12 | (2006.01) |
| F16D 48/04 | (2006.01) |
| F16D 48/06 | (2006.01) |
| F16D 48/02 | (2006.01) |

(52) U.S. Cl.
CPC ............ *F16D 48/066* (2013.01); *F16D 25/14* (2013.01); *F16D 48/04* (2013.01); *F16D 2048/0203* (2013.01); *F16D 2048/0212* (2013.01); *F16D 2048/0254* (2013.01)

(58) Field of Classification Search
CPC ..... F16D 25/08; F16D 25/082; F16D 25/083; F16D 25/087; F16D 25/14; F16D 2025/081; F16D 48/02; F16D 2048/0203; F16D 2048/0212; F16D 2048/0227; F16D 2048/023; F16D 2048/0233; F16D 2048/0245; F16D 2048/0251; F16D 2048/0254
See application file for complete search history.

(56) References Cited

U.S. PATENT DOCUMENTS

| | | | | |
|---|---|---|---|---|
| 6,170,624 | B1 * | 1/2001 | Arai et al. | 192/3.58 |
| 2001/0030098 | A1 * | 10/2001 | Drexl | 192/86 |
| 2001/0037927 | A1 * | 11/2001 | Nagler et al. | 192/85 R |
| 2002/0002101 | A1 * | 1/2002 | Hayashi | 477/168 |
| 2008/0215219 | A1 * | 9/2008 | Porzel et al. | 701/68 |
| 2012/0031086 | A1 * | 2/2012 | Bell et al. | 60/327 |
| 2013/0131943 | A1 * | 5/2013 | Iwao et al. | 701/67 |
| 2013/0138313 | A1 * | 5/2013 | Iwao et al. | 701/67 |
| 2013/0317717 | A1 * | 11/2013 | Lang et al. | 701/68 |

OTHER PUBLICATIONS

U.S. Appl. No. 61/939,890, filed Feb. 14, 2014, first named inventor: Mark Ray Buchanan.
U.S. Appl. No. 62/085,787, filed Dec. 1, 2014, first named inventor : Joel Maguire.
U.S. Appl. No. 62/010,844, filed Jun. 11, 2014, first named inventor: Michael Schwekutsch.

* cited by examiner

*Primary Examiner* — Jacob S Scott
(74) *Attorney, Agent, or Firm* — BrooksGroup

(57) ABSTRACT

A number of variations may include a product comprising: a clutch system comprising: a clutch; a first cylinder operatively connected to the clutch; a piston assembly operatively connected to the first cylinder; a second cylinder operatively connected to the piston assembly; a clutch pedal operatively connected to the second cylinder; and a hydraulic power pack actuator operatively connected to the piston assembly, wherein the piston assembly is constructed and arranged to control actuation of the clutch through the first cylinder in response to actuation from at least one of the clutch pedal or hydraulic power pack actuator.

18 Claims, 6 Drawing Sheets

CONTROL SYSTEM FOR OPERATING A MANUAL CLUTCH

TECHNICAL FIELD

The field to which the disclosure generally relates to includes clutches.

BACKGROUND

A manual transmission vehicle may include one or more clutch systems.

SUMMARY OF ILLUSTRATIVE VARIATIONS

One variation may include a product comprising: a clutch system comprising: a clutch; a first cylinder operatively connected to the clutch; a piston assembly operatively connected to the first cylinder; a second cylinder operatively connected to the piston assembly; a clutch pedal operatively connected to the second cylinder; and a hydraulic power pack actuator operatively connected to the piston assembly, wherein the piston assembly is constructed and arranged to control actuation of the clutch through the first cylinder in response to actuation from at least one of the clutch pedal or hydraulic power pack actuator.

Another variation may include a method comprising: automatically controlling a manual clutch comprising: operatively connecting a hydraulic power pack actuator to a piston assembly which is operatively connected to a clutch; operatively connecting a control unit to the hydraulic power pack actuator; and controlling the hydraulic power pack actuator with the control unit to automatically modulate a pressure to the piston assembly to cause the clutch to go into at least one of an ON, OFF, or slipping mode based on at least one vehicle condition.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
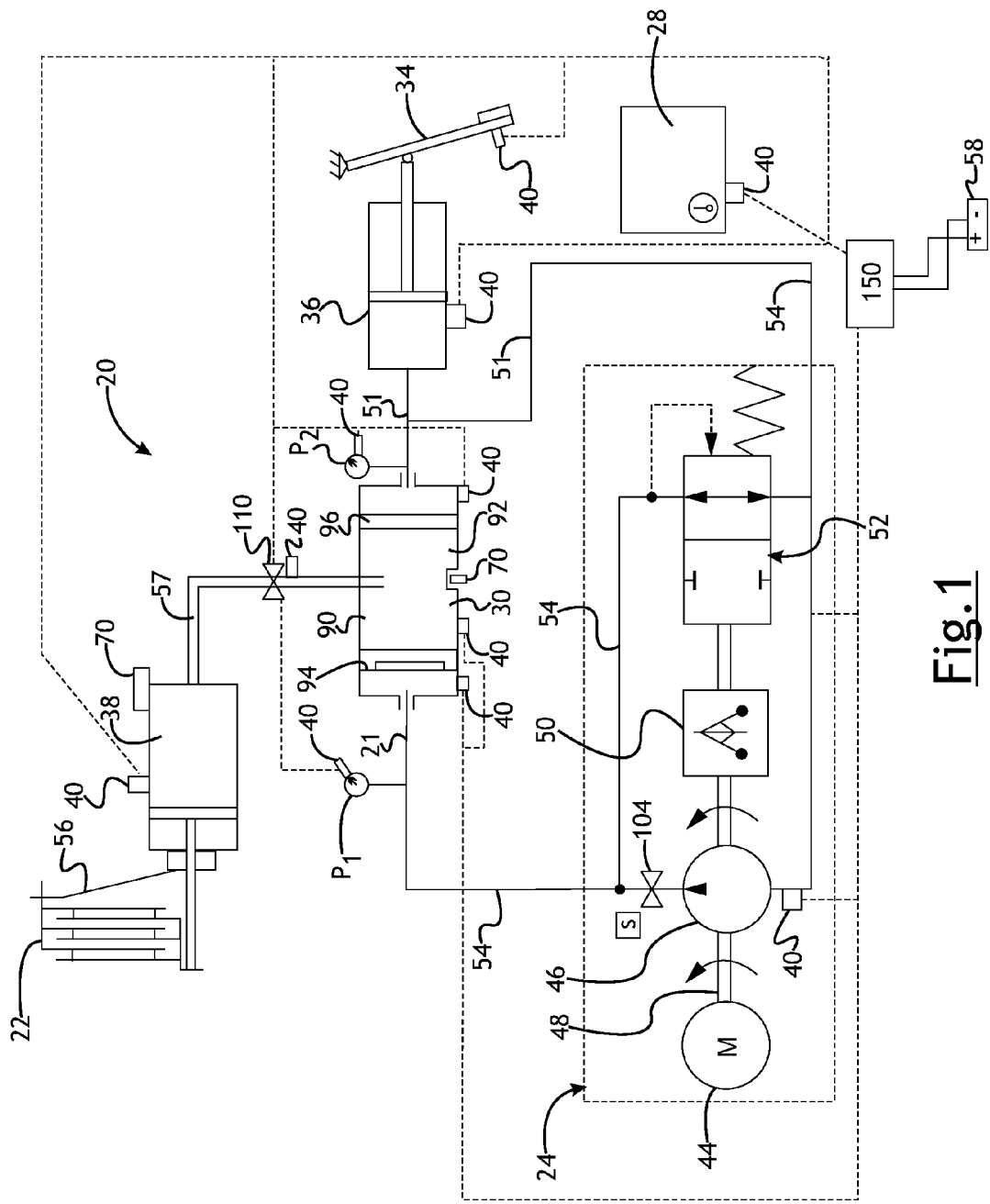
FIG. 1 illustrates a clutch system according to a number of variations.

Referring to FIG. 1, in a number of variations, a manual transmission vehicle may include one or more clutch systems 20. A manual transmission clutch system 20 may be used to transmit or prevent the flow of power from the engine to the transmission. A clutch may comprise a single plate clutch or a multi-plate clutch 22, for example as illustrated in FIG. 1. A clutch 22 may be in an "ON", "OFF", or "slipping" mode. When the clutch 22 is in an ON mode, the engine and the transmission may be engaged which may allow the vehicle to be driven. When the clutch 22 is in an OFF mode, the clutch 22 may cause a disconnect in power between the engine and the transmission. This may allow the engine to run while the vehicle is not in a driving mode and may allow a driver to shift gears. When the clutch 22 is in a slipping mode, the clutch 22 may be in a condition which is neither in a fully ON or OFF mode and may transmit partial power between the engine and transmission.

In a number of variations, a clutch system 20 may comprise a clutch 22 which may be operatively connected to a first cylinder (or slave cylinder) 38. In any number of variations, the slave cylinder 38 may be activated by pressure which may then control the clutch 22. In a number of variations, the clutch system 20 may include a fluid in a fluid circuit 21. In a number of variations, a piston assembly 30 may be operatively connected to the slave cylinder 38 through a slave cylinder line 57, and may control the source of fluid including, but not limited to, hydraulic oil, which may enter into the slave cylinder 38 through the slave cylinder line 57 with pressure from fluid in the piston assembly 30 from either a second cylinder (or master cylinder) 36, or a hydraulic power pack actuator 24, or both. In a number of variations, the piston assembly 30 may be a dual floating piston cylinder, or an assembly including at least two single piston cylinders linked together. In a number of variations, the pressure forces at least one of the pistons of the piston assembly 30 to force fluid into the slave cylinder 38 to actuate the clutch 22. In a number of variations, the master cylinder 36 may be operatively connected to the piston assembly 30 through a hydraulic line 54. In a number of variations, the piston assembly 30, and a clutch pedal 34 may be operatively connected to the master cylinder 36 through a master cylinder line 51. In a number of variations, an operator may activate the clutch pedal 34 by manually stepping and/or pressing down on the clutch pedal 34 which may cause pressure to increase from the master cylinder 36 to the piston assembly 30. In one variation, the pressure generated from the clutch pedal 34 may cause the piston assembly 30 to allow fluid from the master cylinder 36 into the slave cylinder 38 which may cause the clutch 22 to go into OFF mode. In a number of variations, a reservoir 28 may also be operatively connected to the master cylinder 36. In a number of variations, the hydraulic power pack actuator 24 may also be operatively connected to the piston assembly 30. In one variation, the pressure generated from the hydraulic power pack actuator 24 may cause the piston assembly 30 to allow fluid from the reservoir 28 into the slave cylinder 38 which may cause the clutch 22 to go into OFF mode. In a number of variations, a control unit 150 may be operatively connected to the hydraulic power pack actuator 24. In a number of variations, the control unit 150 may be an electronic control unit. In a number of variations, the piston assembly 30 may be constructed and arranged to control actuation of the clutch 22 through the first cylinder 38 in response to actuation from at least one of the clutch pedal 34 or hydraulic power pack actuator 24.

In a number of variations, the clutch 22 may be in an ON mode by reducing the pressure to a slave cylinder 38 attached to the clutch 22. This may be done manually, by releasing the clutch pedal 34, or automatically by releasing pressure from the hydraulic power pack actuator 24 as will be discussed below. In a number of variations, the clutch 22 may be in an OFF mode by increasing the pressure to a slave cylinder 38 attached to the clutch 22. This may be done manually by stepping on the clutch pedal 34, or automatically by increasing the pressure from the hydraulic power pack actuator 24 as will be discussed below.

Figure 5:
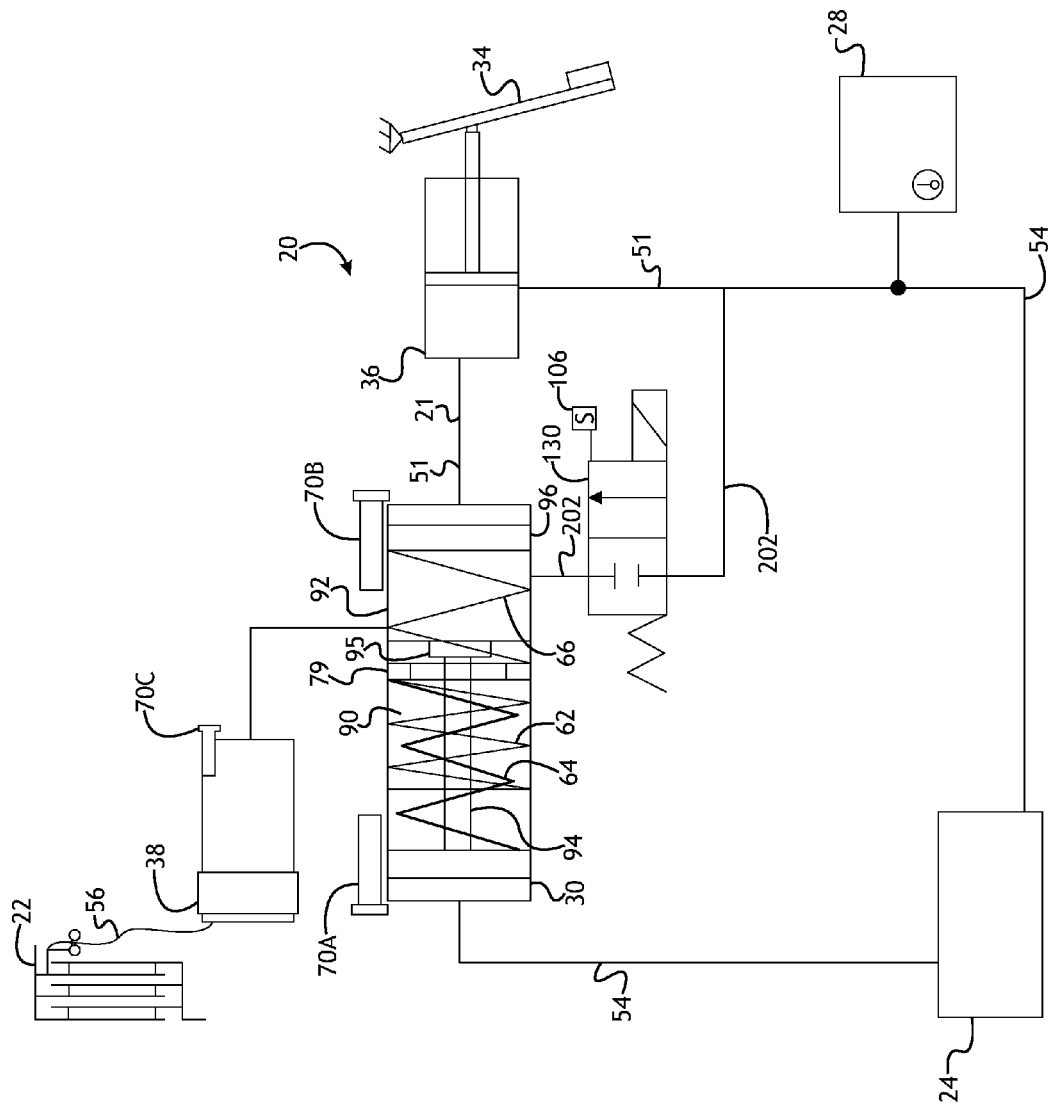
FIG. 5 illustrates a clutch system according to a number of variations.

In any number of variations, a hydraulic power pack actuator 24 may comprise an electric motor 44 and a pump 46. In a number of variations, the hydraulic power pack actuator 24 may further include a pressure regulator 50, and if desired any number of fluid storage devices 28 including, but not limited to, a reservoir 28. In a number of variations, at least one of the master cylinder 36 or hydraulic power pack actuator 24 may be operatively or fluidly connected to the reservoir 28 through the master cylinder line 51, or hydraulic line 54 respectively. Any number of hydraulic power pack actuators 24 may be used including, but not limited to, a centrifugal electro-hydraulic actuator 24. In a number of variations, as shown in FIG. 5, the hydraulic power pack actuator 24 may be any component with the capacity to move fluid around the fluid circuit 21 based on at least one input from the control unit 150 in response to at least one vehicle condition. In a number of variations, the hydraulic power pack actuator 24 may include a pump 46, an electric motor 44, a pressure regulator 50, at least one valve 100, at least one sensor 40, a solenoid, a hydro-mechanical actuator, an accumulator, and may include additional components.

In a number of variations, a centrifugal electro-hydraulic actuator 24 may comprise an electric motor 44 which may drive an actuator pump 46 via a drive shaft 48, which may also drive a centrifugal regulator 50. The position of the centrifugal regulator 50 may control the position of and the flow through one or more pressure overflow valves 52, as shown in FIG. 1. In a number of variations, a fluid including, but not limited to, hydraulic oil may be used in the centrifugal electro-hydraulic actuator 24 system, and may be contained in a reservoir 28. In a number of variations, the fluid may be drawn into the actuator pump 46 through a hydraulic line 54 and may be delivered therefrom toward the piston assembly 30 through a hydraulic line 54. Depending on the position of the centrifugal regulator 50 and/or the pressure overflow valve(s) 52, at least a portion of the hydraulic flow may be diverted through a hydraulic line 54, through the pressure overflow valve 52, and back into the reservoir 28. This may result in the pressure delivered to the piston assembly 30 being governed by the centrifugal regulator 50. In a number of variations, the centrifugal electro-hydraulic actuator 24 may provide a linear relationship between pressure and motor current.

Figure 2:
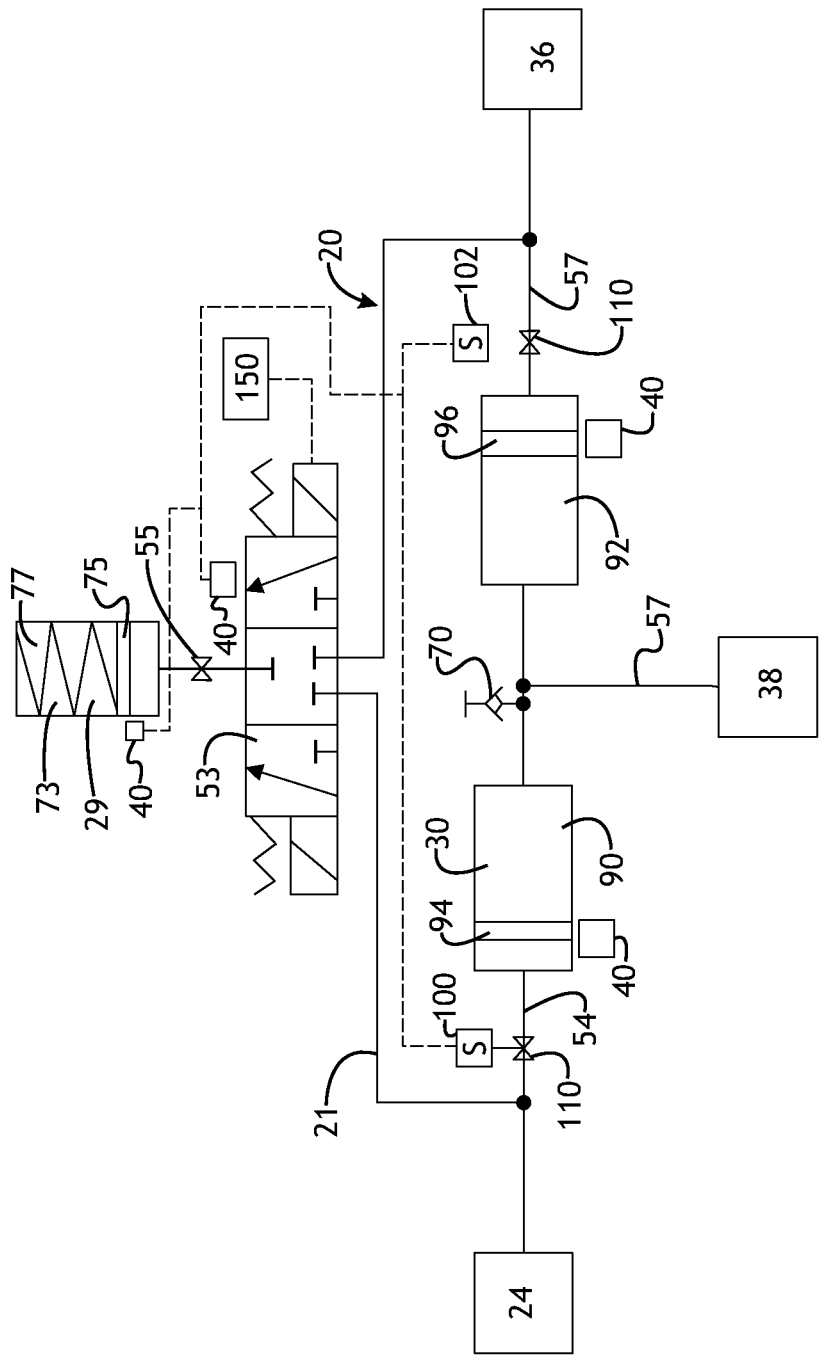
FIG. 2 illustrates a clutch system according to a number of variations.

In a number of variations, as shown in FIG. 2, the clutch system 20 includes wherein the hydraulic power pack actuator 24 and master piston 36 may supply pressure via fluid to the piston assembly 30, and may overflow through an accumulator line 55 into an accumulator 29 based on an input into a position valve 53. In a number of variations, the accumulator 29 may include a chamber 73, a piston 75 and at least one spring 77. In a number of variations, the position valve 53 may be a 3-way, 3 position; 3-way, 4 position; or may be another type. In a number of variations, the position valve 53 may allow for fluid in the clutch system 20 fluid circuit 21 to accumulate and allow for non-actuation of the slave cylinder 38 based on at least one vehicle condition. In a number of variations, the position valve 53 may allow either the clutch pedal 34 or hydraulic power pack actuator 24 to overflow fluid into the accumulator 29 based on either's respective actuation. In a number of variations, the accumulator 29 may be used to return the clutch pedal 34 to its initial un-pressured, non-activated position. In a number of variations, the accumulator 29 may have the same swept volume or slave cylinder displacement volume as the slave cylinder 38. In a number of variations, the accumulator 29 may hold an overflow volume that corresponds to the swept volume or slave cylinder piston displacement volume of the slave cylinder 38. In a number of variations, an additional pressure valve 110 may be included in the clutch system 20 anywhere along the fluid circuit 21. In a number of variations, the position valve 53 may be used to route fluid from the master piston 36 to hydraulic power pack actuator 24. In a number of variations, this action may return the clutch pedal 34 to its initial un-pressured, non-activated position. As shown in FIGS. 1-2, in a number of variations, a solenoid 100, 102, 104 may be used to actuate either of the pistons, and or control the fluid pump 46 of the hydraulic power pack actuator 24. In a number of variations, at least one valve 110 may be included anywhere in the fluid circuit 21. In a number of variations, the valve 110 may include a spool valve, a three-way check valve, or a three-way ball check valve, a ball valve, a gate valve, a butterfly valve, a choke valve, a pinch valve, a needle valve, a poppet valve, a pressure reducing valve, a ball valve, or may be another type. In a number of variations, the valve 110 may be used to initiate a "fail-safe" mode wherein the clutch can be used as normal outside of the fluid circuit 21 altogether.

Figure 4:
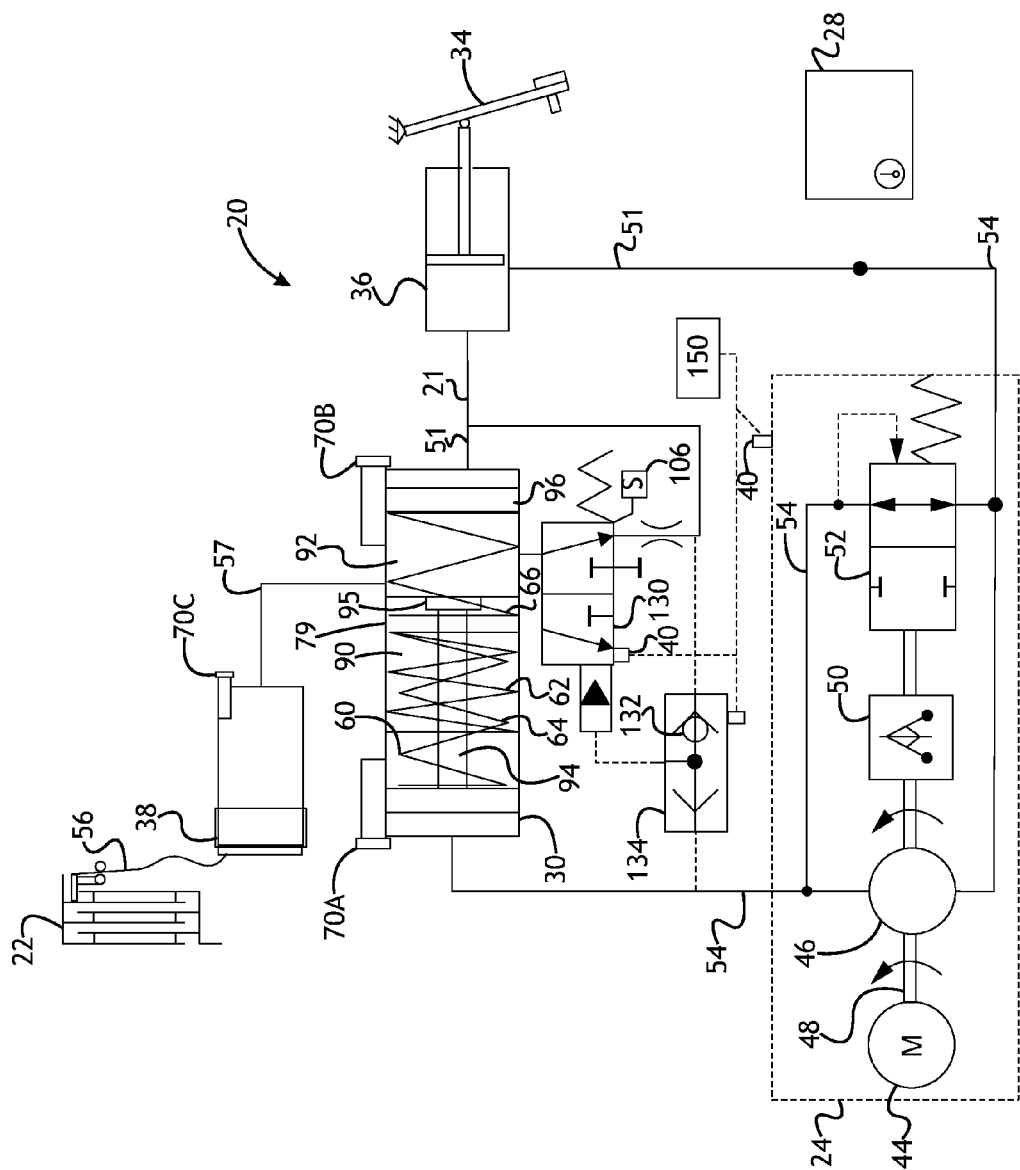
FIG. 4 illustrates a clutch system according to a number of variations.

In a number of variations, the piston assembly 30 may include two chambers 90, 92, including respective pistons 94, 96, operatively connected to, or in fluid communication with, the hydraulic power pack actuator 24 and master cylinder 36 respectively. In a number of variations, the two chambers 90, 92 may each contain substantially the same "swept" volume of fluid or the same displacement volume of fluid as the slave cylinder 38. In a number of variations, the two chambers 90, 92 may each hold an overflow volume that corresponds to the swept volume or slave cylinder displacement volume of the slave cylinder 38. In a number of variations, actuation of either piston 94, 96 may actuate the slave cylinder 38 and the clutch 22 without actuation of the other piston 94, 96. In a number of variations, the piston assembly 30 may include at least one spring 60. Referring to FIG. 4, in a number of variations, the piston assembly 30 may include a spring perch 79, which separates the hydraulic power pack biased chamber 90 from the master cylinder biased chamber 92. In a number of variations, a linearizing spring 62 may work for the protrusion of the hydraulic power pack biased piston 94 into the master cylinder based chamber 92. In a number of variations, a hydraulic power pack biased chamber light spring 64 may return the hydraulic power pack biased piston 94 to the end of the hydraulic power pack biased chamber 90. In a number of variations, a master cylinder biased chamber light spring 66 may return the master cylinder biased piston 96 to the end of the master cylinder biased chamber 92. In a number of variations, the power pack biased chamber light spring 64 may be placed inside a heavier linearizing spring 62 to prevent the power pack biased chamber light spring 64 from being crushed if the stiffness of the heavier linearizing spring 62 is high and the springs 62, 64 were placed in series.

Still referring to FIG. 4, in a number of variations, at least one of the piston assembly 30 or slave cylinder 39 may include an air bleed 70. In a number of variations, the hydraulic power pack biased chamber 90 may have an air bleed 70A. In a number of variations, the master cylinder biased chamber 92 may have an air bleed 70B. In a number of variations, the slave cylinder 38 may have an air bleed 70C. In a number of variations, the air bleeds 70A, 70B, 70C may be opened to air bleed the clutch system 20. In a number of variations, air bleeds for the piston assembly 70A, and 70B may be loosened first followed by the air bleed for the slave cylinder 70C. Next, the hydraulic power pack actuator 24 may be turned on to bleed air through the slave cylinder air bleed 70C. Next, the hydraulic power pack biased chamber air bleed 70A may be closed. Next, the master cylinder side of the clutch system 22 via the fluid circuit 21 may be closed by pressing the clutch pedal 34, closing the air bleed on the slave cylinder 70C, releasing the pedal 34 and repeating as necessary. Next, the slave cylinder air bleed 70C may be closed. Next, the master cylinder biased chamber air bleed 70B may be closed.

Figure 3:
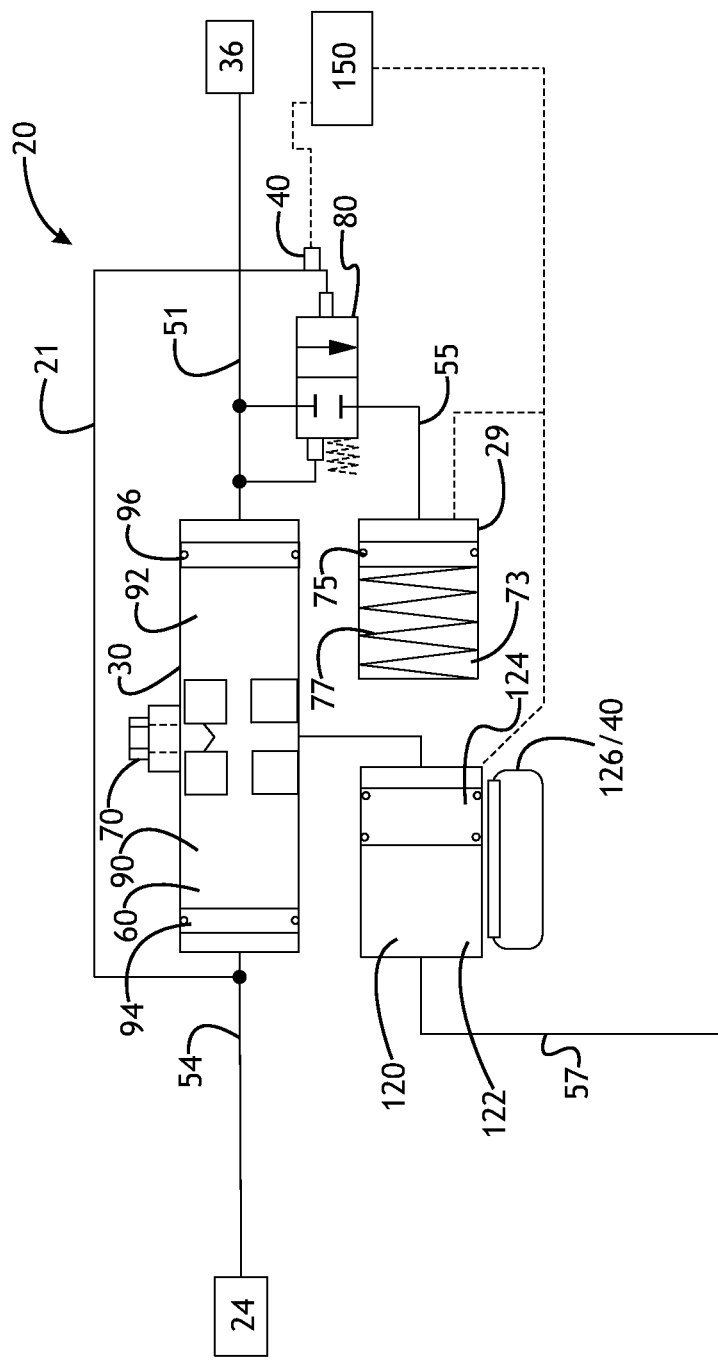
FIG. 3 illustrates a clutch system according to a number of variations.

Referring to FIG. 3, in a number of variations, the clutch system 20 may include a differential pressure sensing valve 80. In a number of variations, the differential pressure sensing valve 80 may be a 2-way 2 position; a 3-way 2 position, 3-way, 3 position; 3-way, 4 position; or may be another type. In a number of variations, the differential pressure sensing valve 80 may open a path from the hydraulic power pack actuator 24 line 54 or master cylinder 36 line 51 to the accumulator 29 based on a vehicle condition. In a number of variations, these components may be constructed and arranged, and controlled to allow for non-negative feedback within the accumulator 29 against the fluid from the hydraulic power pack actuator 24 or master cylinder 36 and may be constructed and arranged, and controlled to allow for return of the clutch pedal 34 to its un-pressured, non-activated position. In a number of variations, the clutch system 20 may include a position sensing cylinder 120 including a chamber 122 and a piston 124. In a number of variations, the position sensing cylinder 120 may include a position sensor 126. In a number of variations, the position sensor 126 may be controlled by a control unit 150 that may control the input of fluid from the position sensing cylinder 120 to the slave piston 38 to control the clutch 22 based on at least one vehicle condition. In a number of variations, the arrangement of these components may be constructed and arranged, and controlled to allow for minimal modification of existing manual clutch systems 20 including minimal modifications to at least one of the slave cylinder 38, clutch 22, master cylinder 36, or clutch pedal 34.

Referring to FIG. 4, in a number of variations, the clutch system 20 may include a secondary valve 130 including, but not limited to, spool valve, a three-way check valve, or a three-way ball check valve. In a number of variations, the secondary valve 130 may be operatively or fluidly connected to the hydraulic line 54 and/or the master cylinder line 51. In a number of variations, the secondary valve 130 may allow fluid from the master cylinder 36 into the master cylinder biased chamber 92 and slave cylinder 38 through the master cylinder line 51. In a number of variations, the secondary valve 130 may allow fluid to the master cylinder 36 from the master cylinder biased chamber 92 and slave cylinder 38 through the master cylinder line 51. In a number of variations, the secondary valve 130 may allow fluid from the hydraulic power pack actuator 24 into the hydraulic power pack actuator biased chamber 90 and slave cylinder 38 through the hydraulic line 54. In a number of variations, the secondary valve 130 may allow fluid to the hydraulic power pack actuator 24 from the master cylinder biased chamber 92 and slave cylinder 38 through the hydraulic line 54. In a number of variations, this may avoid fluid in the hydraulic power pack actuator biased chamber 90 altogether. As shown in FIG. 4, in a number of variations, a ball 132 in a ball check valve 134 may determine the position of the secondary valve in allowing fluid into or out of the master cylinder biased chamber 92 and slave cylinder 38 in controlling the clutch 22. In a number of variations, the ball 132 in the ball check valve 134 may be controlled by a control unit 150 in response to at least one vehicle condition. In a number of variations, the ball check valve 134 may prevent pressure from at least one of the hydraulic power pack actuator 24 or master cylinder 36 from interacting with the other. In a number of variations, pressure from fluid from the hydraulic power pack actuator 24 hydraulic line 54 may shift the ball 132 in the ball check valve 134 and block flow from the master cylinder line 51. In a number of variations, pressure from fluid from the master cylinder line 51 may shift the ball 132 in the ball check valve 134 and block flow from the hydraulic power pack actuator 24 hydraulic line 54. As shown in FIG. 5, in a number of variations, the secondary valve 130 may be a two position one way valve with input only from the master cylinder line 51 between the master cylinder 36 and reservoir 28 via line 202. In a number of variations, the secondary valve 130 may be controlled by a normally closed vent solenoid 106. In a number of variations, the secondary valve 130 may be a 2-position, 1 way valve with input from the master cylinder line 51 between the master cylinder 36 and reservoir 28 wherein the master cylinder line 51 feeds the master cylinder biased chamber 92. In a number of variations, these components may be constructed and arranged, and controlled to allow for equalization of pressure when the control unit 150 detects that neither the master cylinder 36 or hydraulic power pack actuator 24 are applying pressure, such that the solenoid 106 may briefly open the secondary valve 130 to equalize pressure.

Figure 6:
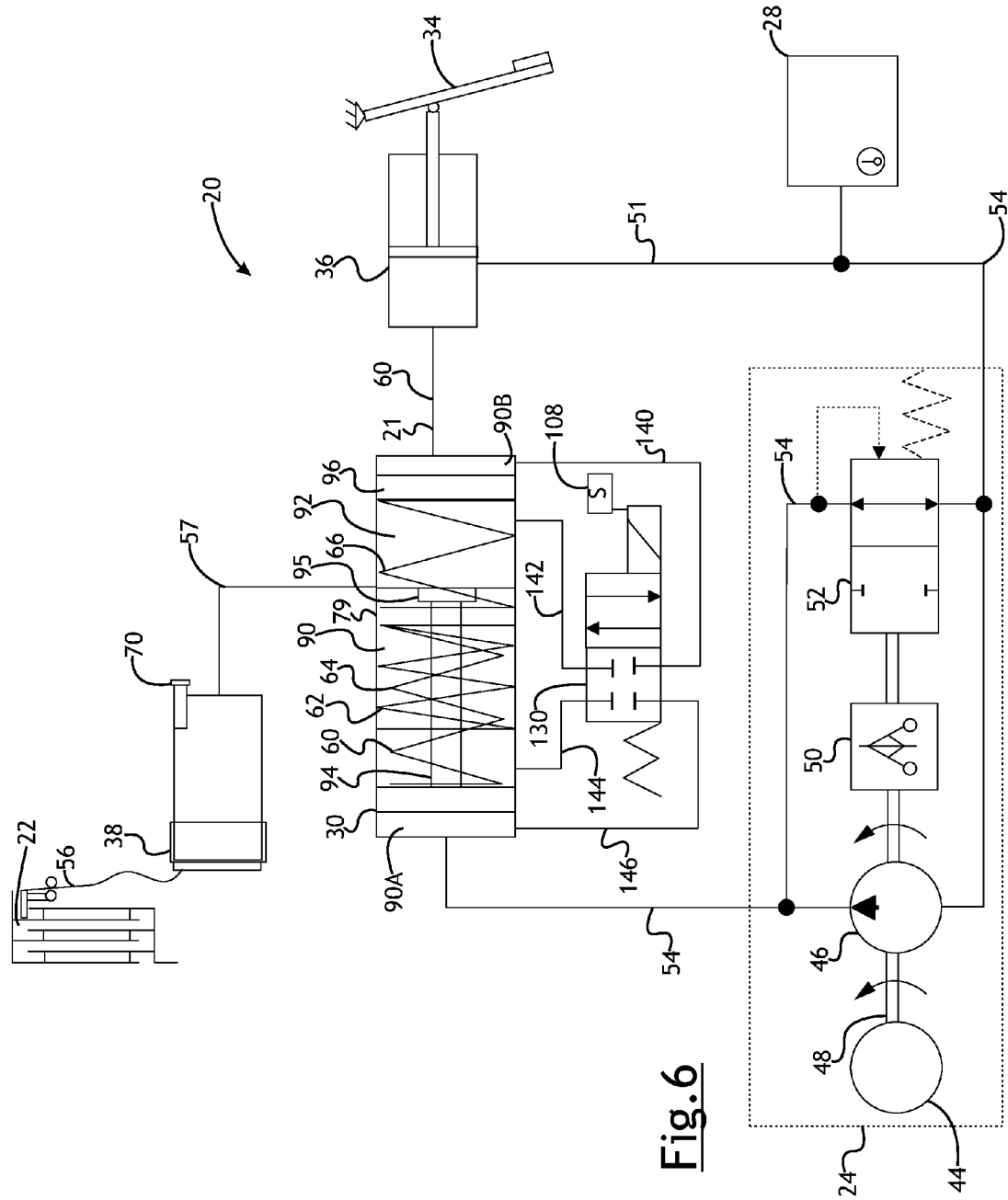
FIG. 6 illustrates a clutch system according to a number of variations.

Referring to FIG. 6, in a number of variations, the secondary valve 130 may be a 2 position, 2 way valve. In a number of variations, the secondary valve 130 may be operatively connected to flow from the hydraulic power pack actuator biased chamber 90, the master cylinder biased chamber 92, the hydraulic power pack actuator biased chamber behind the piston 90A, or the master cylinder biased chamber behind the piston 92B in either direction. In a number of variations, the secondary valve 130 may connect 4 lines including the hydraulic power pack biased chamber line 144, the master cylinder biased chamber line 142, the hydraulic power pack actuator biased chamber behind the piston line 146, or the master cylinder biased chamber behind the piston line 140. In a number of variations, the secondary valve may be controlled by a normally closed bleed solenoid 108. In a number of variations, the solenoid 108 may open and the hydraulic power pack actuator 24 may pump fluid back through the system through the master cylinder 36 and to the reservoir 28. In a number of variations, the solenoid 108 may remain open after the hydraulic power pack actuator 24 is turned off to ensure all pistons 94, 96, stay in position in piston assembly 30. In a number of variations, the solenoid 108 may connect the power pack actuator biased chamber 90, the master cylinder biased chamber 92, the hydraulic power pack actuator biased chamber behind the piston 90A, or the master cylinder biased chamber behind the piston 92B so that fluid may be flushed through the system to remove trapped air and contaminants. In a number of variations, this can be done using the clutch pedal 34 or the hydraulic power pack actuator 24.

Referring back to FIG. 1, in a number of variations, the pressure $P_1$ from the centrifugal electro-hydraulic actuator 24 may be high and the pressure $P_2$ from the master cylinder 36 may be low or zero. In order to increase the pressure $P_1$ from the centrifugal electro-hydraulic actuator 24, the motor current may be increased which may increase the speed of the motor. This may cause the overflow valve(s) 52 to close which may increase the pressure $P_1$. The pressure $P_1$ may then cause the hydraulic power pack biased piston 94 to force fluid from the hydraulic power pack biased chamber 90 into the slave cylinder 38. The oil from the centrifugal electro-hydraulic actuator 24 may then pass through the piston assembly 30 which may activate the slave cylinder 38 which may compress the spring 56 in the clutch 22 which may then set the clutch 22 in OFF mode. In order to reduce the pressure $P_1$ from the centrifugal electro-hydraulic actuator 24, the motor current may be reduced which may decrease the speed of the motor 44. This may cause the centrifugal overflow valve(s) 52 to open and pressure may bleed off which may cause the excess oil to go into the reservoir 28. Even though pressure may be decreasing in the centrifugal electro-hydraulic actuator 24, the pressure may still be higher than the master cylinder 36 pressure so the master cylinder biased piston 96 may remain in a position blocking fluid from reaching the slave cylinder 38 from the master cylinder biased chamber 92. As the pressure from the centrifugal electro-hydraulic actuator is decreased, the spring 56 in the clutch 22 may push the slave cylinder 38 away from the clutch 22 which may then set the clutch 22 in ON mode.

In steady state, the valve(s) 52 may be partially open to maintain a constant pressure.

In a number of variations, the driver may manually activate the clutch pedal 34 which may increase the pressure $P_2$ from the master cylinder 36 so that the pressure is greater than the pressure $P_1$ coming from the centrifugal electro-hydraulic actuator 24. This may cause master cylinder biased piston 96 to force fluid from the master cylinder biased chamber 92 into the slave cylinder 38. This may compress the spring 56 in the clutch 22 which may cause the clutch 22 to go into OFF mode.

In a number of variations, the control unit 150 attached to the centrifugal electro-hydraulic actuator 24 may receive and process input from various sensors in light of stored instructions and/or data, and transmit output signals to various actuators. The control unit 150 may include, for example, an electrical circuit, an electronic circuit or chip, and/or a computer. In an illustrative computer variation, the control unit 150 generally may include one or more processors, memory devices that may be coupled to the processor(s), and one or more interfaces coupling the processor(s) to one or more other devices, including the sensors 40 in the clutch system 20. The processor(s) and other powered system devices may be supplied with electricity by a power supply, for example, one or more batteries 58, fuel cells, or the like. In a number of variations, the control unit 150 used may be dedicated to control at least one of the centrifugal electro-hydraulic actuator 24, dual floating piston chamber 30 including both pistons 94, 96, air bleeds 70, differential pressure sensing valve 80, position sensing cylinder 120, solenoids 100, 102, 104, secondary valve 130, ball pressure valve 134, accumulator 29, position valve 53, at least one sensor 40, position sensing cylinder 129, or position sensor 126, or the control unit 150 used may already exist in the vehicle and may be used for the centrifugal electro-hydraulic actuator 24 as well as for other purposes.

The processor(s) may execute instructions that provide at least some of the functionality for the disclosed system 20 and methods. As used herein, the term instructions may include, for example, control logic, computer software and/or firmware, programmable instructions, or other suitable instructions. The processor may include, for example, one or more microprocessors, microcontrollers, application specific integrated circuits, programmable logic devices, field programmable gate arrays, and/or any other suitable type of electronic processing device(s).

Also, the memory device may be configured to provide storage for data received by or loaded to the engine system, and/or for processor-executable instructions. The data and/or instructions may be stored, for example, as look-up tables, formulas, algorithms, maps, models, and/or any other suitable format. The memory may include, for example, RAM, ROM, EPROM, and/or any other suitable type of storage article and/or device.

Further, the interfaces may include, for example, analog/digital or digital/analog converters, signal conditioners, amplifiers, filters, other electronic devices or software modules, and/or any other suitable interfaces. The interfaces may conform to, for example, RS-232, parallel, small computer system interface, universal serial bus, CAN, MOST, LIN, FlexRay, and/or any other suitable protocol(s). The interfaces may include circuits, software, firmware, or any other device to assist or enable the control unit 26 in communicating with other devices.

The methods or parts thereof may be implemented in a computer program product including instructions carried on a computer readable medium for use by one or more processors to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program may be executed on one processor or on multiple processors in communication with one another.

The program(s) can be embodied on computer readable media, which can include one or more storage devices, articles of manufacture, or the like. Illustrative computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium also may include computer to computer connections, for example, when data is transferred or provided over a network or another communications connection (either wired, wireless, or a combination thereof). Any combination(s) of the above examples is also included within the scope of the computer-readable media. It is therefore to be understood that the method may be at least partially performed by any electronic articles and/or devices capable of executing instructions corresponding to one or more steps of the disclosed methods.

In any number of variations, the electronic control unit 150 may receive signals from one or more sensors 40 and/or signals, for example as illustrated in FIG. 1, including, but not limited to, pressure and oil temperature sensors, a system enable switch, a gear change switch, and/or any signals from other sources. It may then process this information to determine whether one or more vehicle conditions including, but not limited to, semi-autonomous driving of the manual transmission in traffic congestion and/or situations where the driver is required to brake often while driving, creep, launch, or anti-stall are occurring. If signals are sent to the electronic control unit 150 that a vehicle condition including, but not limited to, semi-autonomous driving of the manual transmission, creep, launch, or anti-stall is occurring, the electronic control unit 150 may process the information and send signals to the centrifugal electro-hydraulic actuator 24 to modulate the pressure toward the piston assembly which may cause the clutch 22 to go into an ON, OFF, or slipping mode. This may prevent or reduce stalling, improve the launch feel, and/or reduce high energy inputs to the clutch 22 associated with abusive maneuvers.

The electronic control unit 150 may also be configured with a software algorithm which may enhance stop-start, stop-start coasting, and/or enable sailing. In a number of variations, stop-start may be enhanced by "stop in gear" which may allow the driver to leave the gear engaged as opposed to the driver having to move a lever to disengage all the gears (neutral). Sailing may occur when the clutch is disengaged when the vehicle is coasting to reduce braking of the vehicle. Stop-start coasting may be similar to sailing, but the engine may also be stopped while coasting. The engine may then be quickly restarted and the clutch 22 may be engaged when the driver steps back on the gas pedal.

In a number of variations, the centrifugal electro-hydraulic actuator 24 may be operatively or fluidly connected to a reservoir 28 or may be a self-contained pressure source.

In any number of variations, if the pressure $P_1$ generated from the centrifugal electro-hydraulic actuator 24 is greater than the pressure $P_2$ generated from the clutch pedal 34, then the centrifugal electro-hydraulic actuator 24 may automatically control the clutch 22. If the pressure $P_2$ generated from the clutch pedal 34 is greater than that generated from the centrifugal electro-hydraulic actuator 24, then the clutch 22 may be controlled manually by the clutch pedal 34. In a number of variations, the centrifugal electro-hydraulic actuator 24 or the clutch pedal 34 may operate independently to actuate the slave cylinder 38 through their respective pistons 94, 96.

In a number of variations, the hydraulic power pack 24 may be implemented into a dry clutch system or a wet clutch system. In a variation where a wet clutch system may be used, a hydraulic power pack 24 may also provide lubrication and/or cooling oil to the clutch 22.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a method comprising: automatically controlling a manual clutch comprising: operatively connecting a hydraulic power pack actuator to a piston assembly which is operatively connected to a clutch; operatively connecting a control unit to the hydraulic power pack actuator; and controlling the hydraulic power pack actuator with the control unit to automatically modulate a pressure to the piston assembly to cause the clutch to go into at least one of an ON, OFF, or slipping mode based on at least one vehicle condition.

Variation 2 may include a method as set forth in Variation 1 further comprising: manually controlling the manual clutch comprising: operatively connecting a clutch pedal to the piston assembly and manually engaging or disengaging the clutch pedal to increase or decrease pressure to the piston assembly to cause the clutch to go into at least one of the ON, OFF, or slipping mode.

Variation 3 may include a method as set forth in any of Variations 1-2 wherein the hydraulic power pack actuator causes the clutch to go into the OFF mode if a first pressure from the hydraulic power pack actuator is greater than a second pressure from the clutch pedal and wherein the clutch pedal causes the clutch to go into the OFF mode if the second pressure from the clutch pedal is greater than the first pressure from the hydraulic power pack actuator.

Variation 4 may include a method as set forth in any of Variations 1-3 wherein the hydraulic power pack actuator is a centrifugal electro-hydraulic actuator.

Variation 5 may include a method as set forth in any of Variations 1-4 wherein the piston assembly includes an air bleed.

Variation 6 may include a method as set forth in any of Variations 1-5 wherein the electronic control unit comprises at least one software algorithm which is configured to automatically modulate the pressure to the passive valve to cause the clutch to go into at least one of the ON, OFF, or slipping mode.

Variation 7 may include a method as set forth in any of Variations 1-6 wherein an accumulator is operatively connected to the piston assembly.

Variation 8 may include a method as set forth in any of Variations 1-7 wherein the piston assembly includes at least one spring.

Variation 9 may include a method as set forth in any of Variations 1-8 wherein the clutch is a dry clutch.

Variation 10 may include a method as set forth in any of Variations 1-8 wherein the clutch is a wet clutch.

Variation 11 may include a product comprising: a clutch control system comprising: a clutch; a first cylinder operatively connected to the clutch; a piston assembly operatively connected to the first cylinder; a second cylinder operatively connected to the piston assembly; a clutch pedal operatively connected to the second cylinder; and a hydraulic power pack actuator operatively connected to the piston assembly wherein the piston assembly is constructed and arranged to control actuation of the clutch through the first cylinder in response to actuation from at least one of the clutch pedal or hydraulic power pack actuator.

Variation 12 may include a product as set forth in Variation 11 further comprising a reservoir or accumulator operatively connected to the second cylinder and the hydraulic power pack actuator.

Variation 13 may include a product as set forth in any of Variations 11-12 wherein the electronic control unit includes at least one software algorithm which controls the hydraulic power pack actuator to modulate the pressure to the passive valve to cause the clutch to go into at least one of the ON, OFF, or slipping mode based on at least one vehicle condition.

Variation 14 may include a product as set forth in Variation 13 wherein the piston assembly includes an air bleed.

Variation 15 may include a product as set forth in any of Variations 13-14 wherein the at least one software algorithm is configured to enhance at least one of a stop-start or a stop-start coasting condition.

Variation 16 may include a product as set forth in any of Variations 13-15 wherein the piston assembly includes at least one spring.

Variation 17 may include a product as set forth in any of Variations 11-16 wherein the hydraulic power pack actuator is a centrifugal electro-hydraulic actuator.

Variation 18 may include a product as set forth in any of Variations 11-17 wherein the piston assembly contains enough volume to operate the first cylinder from either the second cylinder or hydraulic power pack actuator.

Variation 19 may include a product as set forth in any of Variations 11-18 wherein the clutch is a dry clutch.

Variation 20 may include a product as set forth in any of Variations 11-18 wherein the clutch is a wet clutch.

The above description of select variations within the scope of the invention is merely illustrative in nature and, thus, variations or variants thereof are not to be regarded as a departure from the spirit and scope of the invention.

What is claimed is:

1. A method comprising:
 automatically controlling a manual clutch comprising:
 operatively connecting a hydraulic power pack actuator to a piston assembly which is operatively connected to a clutch;
 operatively connecting a control unit to the hydraulic power pack actuator; and
 controlling the hydraulic power pack actuator with the control unit to automatically modulate a pressure to the piston assembly to cause the clutch to go into at least one of an ON, OFF, or slipping mode based on at least one vehicle condition wherein the hydraulic power pack actuator is a centrifugal electro-hydraulic actuator.

2. The method of claim 1 further comprising:
 manually controlling the manual clutch comprising:
 operatively connecting a clutch pedal to the piston assembly and manually engaging or disengaging the clutch pedal to increase or decrease pressure to the piston assembly to cause the clutch to go into at least one of the ON, OFF, or slipping mode.

3. The method of claim 2 wherein the hydraulic power pack actuator causes the clutch to go into the OFF mode if a first pressure from the hydraulic power pack actuator is greater than a second pressure from the clutch pedal and wherein the clutch pedal causes the clutch to go into the OFF mode if the second pressure from the clutch pedal is greater than the first pressure from the hydraulic power pack actuator.

4. The method of claim 1 wherein the piston assembly includes an air bleed.

5. The method of claim 1 wherein the control unit comprises at least one software algorithm which is configured to automatically modulate the pressure to the piston assembly to cause the clutch to go into at least one of the ON, OFF, or slipping mode.

6. The method of claim 5 wherein an accumulator is operatively connected to the piston assembly.

7. The method of claim 5 wherein the piston assembly includes at least one spring.

8. The method of claim 1 wherein the clutch is a dry clutch.

9. The method of claim 1 wherein the clutch is a wet clutch.

10. A product comprising:
 a clutch control system comprising:
 a clutch;
 a first cylinder operatively connected to the clutch;
 a piston assembly operatively connected to the first cylinder;
 a second cylinder operatively connected to the piston assembly;
 a clutch pedal operatively connected to the second cylinder; and
 a hydraulic power pack actuator operatively connected to the piston assembly wherein the piston assembly is constructed and arranged to control actuation of the clutch through the first cylinder in response to actuation from at least one of the clutch pedal or hydraulic power pack actuator wherein the hydraulic power pack actuator is a centrifugal electro-hydraulic actuator.

11. The product as set forth in claim 10 further comprising at least one of a reservoir or accumulator operatively connected to at least one of the second cylinder or the hydraulic power pack actuator.

12. The product of claim 10 wherein the product further includes a control unit operatively connected to the hydraulic power pack actuator wherein the control unit includes at least one software algorithm which controls the hydraulic power pack actuator to modulate the pressure to the piston assembly to cause the clutch to go into at least one of the ON, OFF, or slipping mode based on at least one vehicle condition.

13. The product of claim 12 wherein the piston assembly includes an air bleed.

14. The product of claim 12 wherein the at least one software algorithm is configured to enhance at least one of a stop-start or a stop-start coasting condition.

15. The product of claim 12 wherein the piston assembly includes at least one spring.

16. The product of claim 10 wherein the piston assembly contains enough volume to operate the first cylinder from either the second cylinder or hydraulic power pack actuator.

17. The product of claim 10 wherein the clutch is a dry clutch.

18. The product of claim 10 wherein the clutch is a wet clutch.

* * * * *